US011255662B2

(12) United States Patent
Ghim et al.

(10) Patent No.: US 11,255,662 B2
(45) Date of Patent: Feb. 22, 2022

(54) SYSTEM AND METHOD FOR COMPENSATING FOR NON-LINEAR RESPONSE CHARACTERISTIC IN PHASE-SHIFTING DEFLECTOMETRY

(71) Applicant: Korea Research Institute of Standards and Science, Daejeon (KR)

(72) Inventors: Young-sik Ghim, Sejong (KR); The-mahn Nguyen, Daejeon (KR); Hyug-gyo Rhee, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 0 days.

(21) Appl. No.: 16/610,664

(22) PCT Filed: Aug. 14, 2018

(86) PCT No.: PCT/KR2018/009337
§ 371 (c)(1),
(2) Date: Nov. 4, 2019

(87) PCT Pub. No.: WO2019/146861
PCT Pub. Date: Aug. 1, 2019

(65) Prior Publication Data
US 2021/0172731 A1    Jun. 10, 2021

(30) Foreign Application Priority Data
Jan. 23, 2018 (KR) .................. 10-2018-0008341

(51) Int. Cl.
*G01B 11/24* (2006.01)
*G01B 11/25* (2006.01)
*H04N 5/235* (2006.01)

(52) U.S. Cl.
CPC ...... *G01B 11/2441* (2013.01); *G01B 11/2527* (2013.01); *H04N 5/2351* (2013.01)

(58) Field of Classification Search
CPC .......... G01B 11/2441; G01B 11/2527; G01B 11/2513; G01B 9/02058; G01B 11/2531;
(Continued)

(56) References Cited

U.S. PATENT DOCUMENTS 7,286,246 B2    10/2007 Yoshida
7,454,054 B2    11/2008 Fukumoto
(Continued)

FOREIGN PATENT DOCUMENTS

JP    2010-074107 A    4/2010
KR    10-2017-0051746 A    5/2017

OTHER PUBLICATIONS

Zhaoyang Wang, Advanced iterative algorithm for phase extraction of randomly phase-shifted interferograms, 2004, Opt. Lett. 29, 1671-1673 (Year: 2004).*
(Continued)

*Primary Examiner* — Michael P LaPage
(74) *Attorney, Agent, or Firm* — Akerman LLP

(57) ABSTRACT

The present disclosure is directed to a system and a method for compensating non-linear response characteristics in measuring the shape of an object using phase-shifting deflectomerty. More particularly, the present disclosure is directed to a method for compensating non-linear response characteristics in phase-shifting deflectometry including steps of: generating a pattern by a pattern generating portion and projecting the same to a measurement object; obtaining an image of a deformed pattern reflected from the measurement object by a detector; linearizing non-linear responses on the basis of a look up table considering non-linear response characteristics of the pattern generating portion and the detector by a compensation means; and compensating phase-shifting amounts generated due to non-linear response characteristics by the compensation means.

6 Claims, 3 Drawing Sheets

(58) Field of Classification Search
CPC .............. G01B 11/2545; G01B 11/254; G01B 11/2627; H04N 5/2351; G06F 17/10
See application file for complete search history.

(56) References Cited

U.S. PATENT DOCUMENTS

| | | |
|---|---|---|
| 2003/0030816 A1 | 2/2003 | Eom et al. |
| 2004/0046966 A1* | 3/2004 | Fujita ..................... G01B 11/25 356/604 |
| 2004/0174526 A1* | 9/2004 | Tang .................. G01B 9/02057 356/512 |
| 2007/0115484 A1* | 5/2007 | Huang ............... G01B 11/2504 356/604 |
| 2007/0206204 A1* | 9/2007 | Jia ..................... G01B 11/2527 356/604 |
| 2010/0149551 A1* | 6/2010 | Malinkevich .......... G01B 11/25 356/603 |
| 2016/0178355 A1* | 6/2016 | Ge ....................... G06K 9/2036 348/136 |
| 2020/0158498 A1* | 5/2020 | Loferer ................ H04N 5/2351 |

OTHER PUBLICATIONS

International Search Report dated Nov. 14, 2018 in connection with PCT Application No. PCT/KR2018/009337.

* cited by examiner

[FIG. 1]
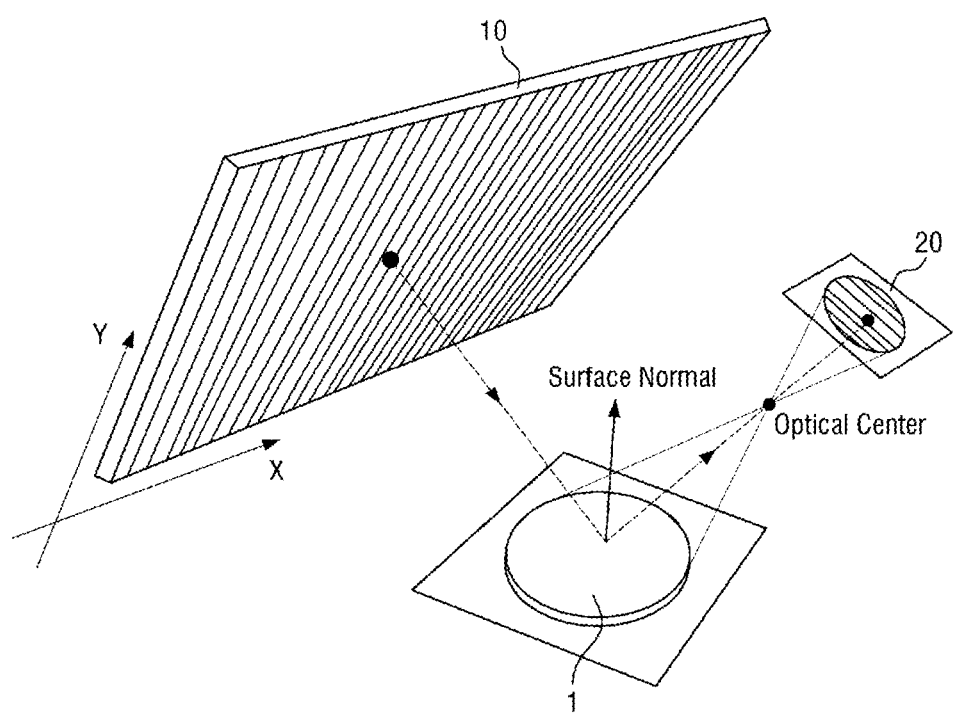
[FIG. 2]
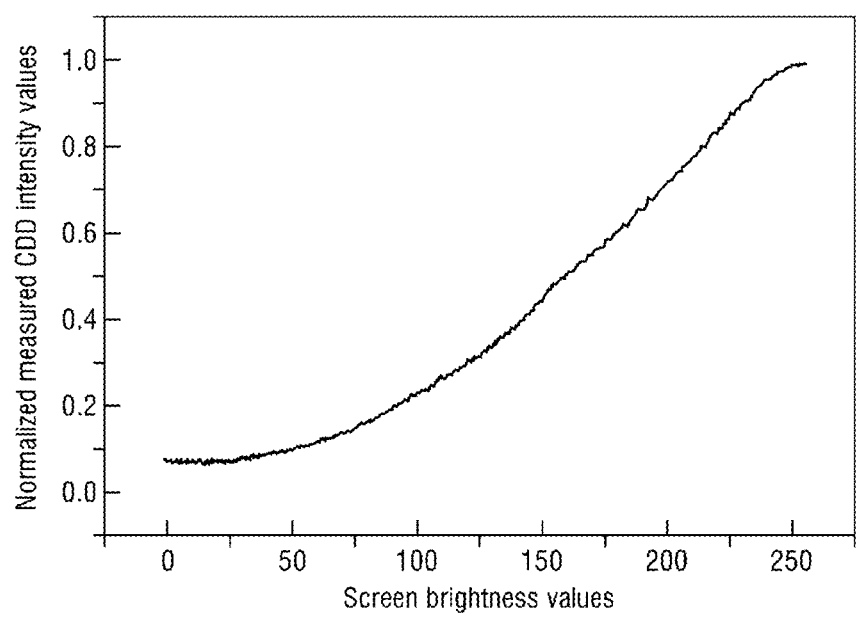

[FIG. 3]
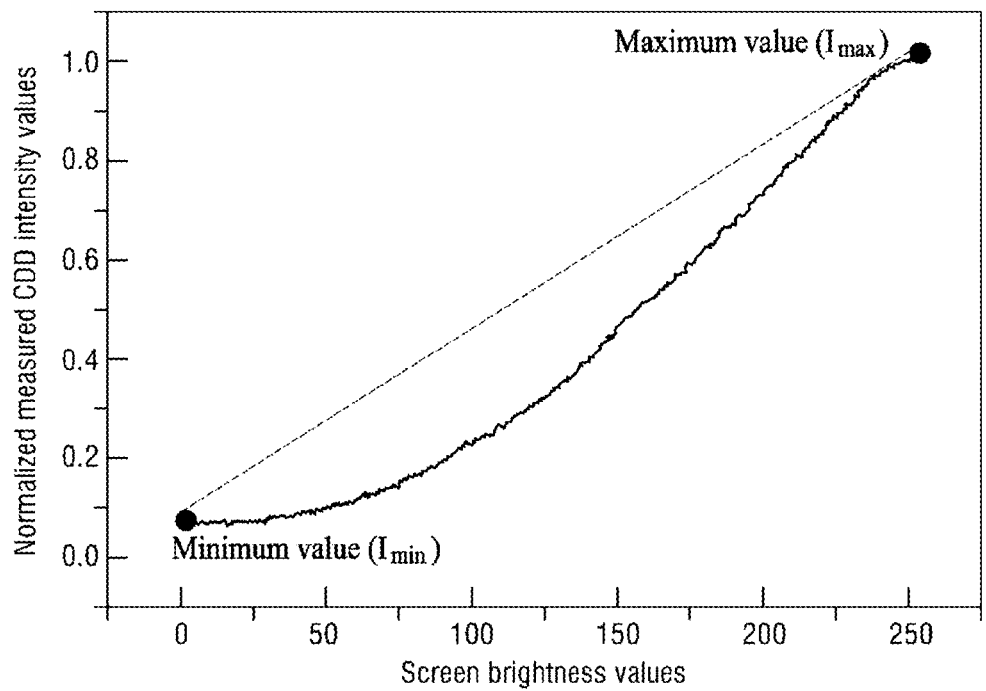
[FIG. 4]
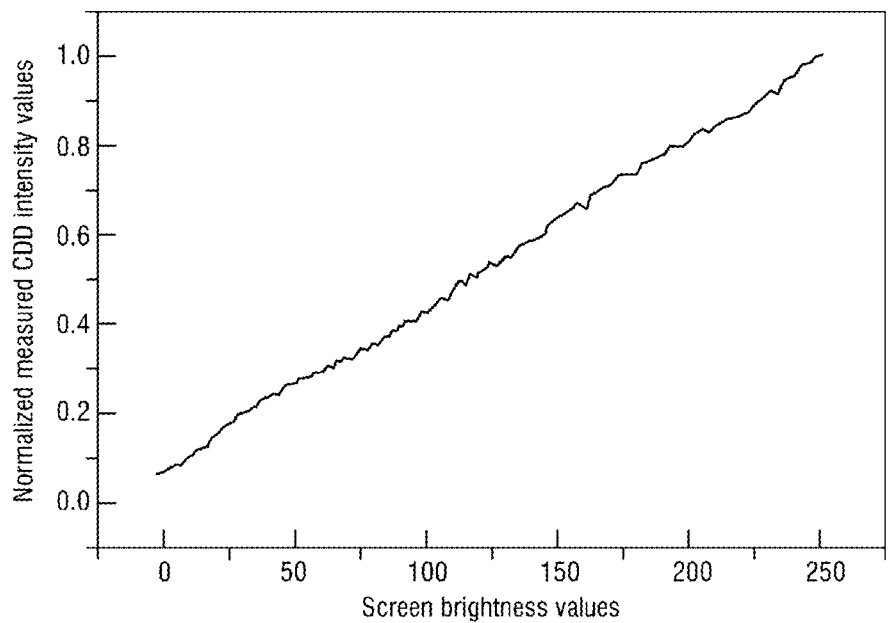

[FIG. 5]
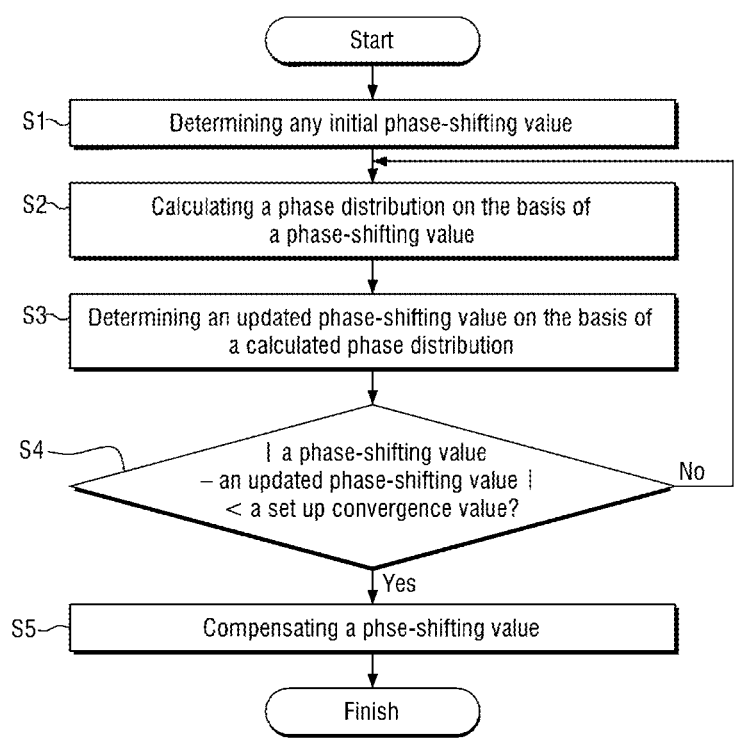

SYSTEM AND METHOD FOR COMPENSATING FOR NON-LINEAR RESPONSE CHARACTERISTIC IN PHASE-SHIFTING DEFLECTOMETRY

CROSS-REFERENCE TO RELATED APPLICATIONS

This application is a national phase of PCT/KR2018/009337, filed Aug. 14, 2018, and claims priority to KR 10-2018-0008341, filed Jan. 23, 2018, the entire contents of both of which are hereby incorporated by reference.

TECHNICAL FIELD

The present disclosure relates to a method and a system for compensating non-linear response characteristics in measuring the shape of an object using phase-shifting deflectometry.

DESCRIPTION OF THE RELATED ART

The freeform surface refers to any surface which has asymmetry with respect to any axis. Recently, the core parts of state-of-the-art optical devices, such as smart glasses and head mounted display (HMD), have been composed of freeform surfaces. Since this freeform surface allows not only exceeding the limit of optical performance of the optical system composed of only either a spherical surface or an aspheric surface but also satisfying design elements, it has been studied world widely. Phase-shifting deflectometry is a typical technique capable of measuring a three-dimensional shape of the freeform surface, which allows measuring the three dimensional shape of a measurement object without any separate reference surface, differently from conventional interferometers. Therefore, it has been spotlighted as the next-generation freeform surface profiler.

A basic principal of phase-shifting deflectometry allows incidence of a striped pattern having periodic pattern on a surface of a measurement object and then analyzes the phase of the pattern deflected by the shape of the measurement object, allowing measuring gradient changes of each surface. That is, if assuming that the shape of the measurement object is that z=z(x,y), the measured value obtained through phase-shifting deflectometry allows obtaining a gradient component ($\partial z/\partial x$) of an X axis and a gradient component ($\partial z/\partial y$) of a Y axis, respectively, according to the direction of the incident pattern. Accordingly, the two gradient components of the X axis and the Y axis obtained from the measured phase are integrated, allowing restoring a three dimensional shape of the measurement object.

In this case, since the accuracy of the measured phase is affected by non-linear response characteristics of the used camera and the screen, it is necessary to compensate the same, allowing reducing measurement errors.

Most commercial displays including LCD generally have a nonlinear sensitivity characteristics and a relatively greater difference in dark colors than in bright one, in order to enhance human visual perception. However, the sensitivity characteristic of digital devices such as a camera according to luminance differs from human eyes.

In phase-shifting deflectometry, the intensity of a sinusoidal pattern generated on a display for the measurement is obtained by measuring the intensity of a distorted sinusoidal pattern rather than the actual sinusoidal pattern through the camera. A non-linear component in the aforesaid displays and cameras causes a serious measurement error in the measured results.

Thus, there is a need for a method which is capable of improving the measurement accuracy through a non-linear response characteristic compensation algorithm optimized for phase-shifting deflectometry.

DESCRIPTION OF THE INVENTION

Technical Problems to be Solved

Therefore, in order to solve the aforesaid drawbacks of the related arts, the present disclosure is directed to providing a method for compensating non-linear response characteristics which were caused by digital devices (i.e., screen, camera) in phase-shifting deflectometry.

According to an exemplary embodiment of the present disclosure, a first step is to create a look up table considering non-linear response characteristics in a screen pattern to linearize response characteristics of a measurement system closer to linearity. In the second stage, the AIA phase shift algorithm, which is widely used to reduce the phase shift error in the interferometer, is applied to compensate the nonlinear response characteristics. Thus, the present disclosure is directed to providing a method for compensating non-linear response characteristics in measuring the shape of an object using phase-shifting deflectometry, which may measure a phase without any errors caused by non-linear response characteristics in phase-shifting deflectometry and the three dimensional shape of a measurement object with a high accuracy.

In the meantime, technical problems to be solved in the present disclosure are not limited to the aforementioned problems, and other technical problems, which are not mentioned above, may be clearly understood from the following description by those skilled in the art to which the present disclosure pertains.

Technical Solution

According to the first aspect of the present disclosure, a system for compensating non-linear response characteristics in phase-shifting deflectometry may include: a pattern generating portion which generates a pattern, allowing projecting the same to a measurement object; a detector which obtains an image of a deformed pattern reflected from the measurement object; and a compensation means which compensates non-linear response characteristics generated due to the pattern generating portion and the detector.

According to another aspect of the present disclosure, the pattern generating portion may be a screen for generating a pattern, and the detector may be a camera.

According to another aspect of the present disclosure, the compensation means may linearize non-linear response on the basis of a look up table considering non-linear response characteristics of the screen and the camera.

According to another aspect of the present disclosure, measured camera intensities may be normalized at predetermined steps from a minimum value to a maximum value of overall screen brightness of the screen, a non-linear response characteristic graph may be calculated by normalization, and the non-linear response characteristic may be converted into a linear response characteristic on the basis of a look up table.

According to another aspect of the present disclosure, in a non-linear response characteristic graph, a normalized linear response characteristic model equation of the following equation 1 which linearly connects a minimum value ($I_{min}$) and a maximum value ($I_{max}$) may be generated:

$$Y_{linear\_model} = \alpha X + \beta \quad \text{[Equation 1]}$$

in the equation 1, X represents a screen brightness value (X=0, 1, 2, 3, 4 . . . , 255) which are provided as inputs before compensation, $\alpha$ and $\beta$ represent coefficient values which linearize response characteristics according to a screen brightness value and which are provided respectively by $\alpha = (I_{max} - I_{min})/255$ and $\beta = I_{min}$, and a normalized linear response characteristic model value is $Y_{linear\_model}$ therethrough.

According to another aspect of the present disclosure, an input and an output from a measured non-linear response characteristic graph may be converted respectively into normalized measurement intensity and a screen brightness value, allowing generating an equation of high degree represented by the following equation 2 and consequently obtaining inverse function response characteristics:

$$X = a_5 \times Y^5_{nor\_mea} + a_4 \times Y^4_{nor\_mea} + a_3 \times Y^3_{nor\_mea} + a_2 \times Y^2_{nor\_mea} + a_1 \times Y_{nor\_mea} + a_0 \quad \text{[Equation 2]}$$

in the equation 2, $Y_{nor\_mea}$ represents normalized measured camera intensity, X represents corresponding a screen brightness value before compensation, $a_5, a_4, a_3, a_2, a_1$ and $a_0$ represent coefficient values which are obtained by fitting inverse function characteristics obtained using a measured non-linear response characteristic graph with an equation of high degree (quantic equation).

According to another aspect of the present disclosure, a brightness value to be input in a screen in order to linearize response characteristics of normalized measured camera intensity on the basis of the equations 1 and 2 may be represented by equation 3:

$$X_{new\_input} = a_5 \times Y^5_{linear\_model} + a_4 \times Y^4_{linear\_model} + a_3 \times Y^3_{linear\_model} + a_2 \times Y^2_{linear\_model} + a_1 \times Y_{linear\_model} + a_0 = a_5 \times (\alpha X + \beta)^5 + a_4 \times (\alpha X + \beta)^4 + a_3 \times (\alpha X + \beta)^3 + a_2 \times (\alpha X + \beta)^2 + a_1 \times (\alpha X + \beta) + a_0 \quad \text{[Equation 3]}$$

in the equation 3, all coefficient values are obtained through equations 1 and 2, X represents screen brightness values before compensation, and $X_{new\_input}$ represents a screen brightness value after compensation, allowing linearizing response characteristics.

When normalized measured camera intensity on the basis of the aforedescribed equations 1, 2 and 3 are linearized through equation 1, a brightness value to be input in a screen may be obtained from equation 3, followed by applying the same to an actual screen, allowing obtaining linear response characteristics.

According to another aspect of the present disclosure, phase-shifting amounts generated by non-linear response characteristics are compensated.

According to another aspect of the present disclosure, the phase-shifting amounts may be computed by applying an AIA (Advanced Iterative Algorithm) phase-shifting algorithm.

According to the second aspect to the present disclosure, a method for compensating non-linear response characteristics in phase-shifting deflectometry may include steps of: generating a pattern by a pattern generating portion and projecting the same to a measurement object; obtaining an image of a deformed pattern reflected from the measurement object by a detector; linearizing non-linear responses on the basis of a look up table considering non-linear response characteristics of the pattern generating portion and the detector by a compensation means; and compensating phase-shifting amounts generated due to non-linear response characteristics by the compensation means.

According to another aspect of the present disclosure, the step of compensating the phase-shifting amounts may allow computing the phase-shifting amounts by applying AIA phase-shifting algorithm, and may include steps of:

the step of compensating the phase-shifting amounts allows computing the phase-shifting amounts by applying AIA phase-shifting algorithm, and comprises steps of: a first step of computing the phase-shifting amounts by applying AIA phase-shifting algorithm, followed by setting up any initial phase-shifting value; a second step of calculating a phase distribution on the basis of a phase-shifting value; a third step of updating a phase-shifting value on the basis of a calculated phase distribution; and a fourth step of repeating the second and third steps until a difference between the phase-shifting value and the updated phase-shifting value becomes equal to less than a set convergence value.

According to another aspect of the present disclosure, the step of linearizing non-linear responses may allow calculating measured camera intensities at predetermined steps from a minimum value to a maximum value of overall screen brightness of the screen, calculating a non-linear response characteristic graph by normalization, and converting the non-linear response characteristic into a linear response characteristic on the basis of a look up table.

According to another aspect of the present disclosure, in a non-linear response characteristic graph, a normalized linear response characteristic model equation of the following equation 1 which linearly connects a minimum value ($I_{min}$) and a maximum value ($I_{max}$) may be generated:

$$Y_{linear\_model} = \alpha X + \beta \quad \text{[Equation 1]}$$

in the equation 1, X represents a screen brightness value (X=0, 1, 2, 3, 4 . . . , 255) which are provided as inputs before compensation, $\alpha$ and $\beta$ represent coefficient values which linearize response characteristics according to screen brightness values and which are provided respectively by $\alpha = (I_{max} - I_{min})/255$ and $\beta = I_{min}$, and a normalized linear response characteristic model value is $Y_{linear\_model}$ therethrough.

According to another aspect of the present disclosure, an input and an output from a measured non-linear response characteristic graph may be converted respectively into normalized measurement intensity and a screen brightness value, allowing generating an equation of high degree represented by the following equation 2 and consequently obtaining inverse function response characteristics:

$$X = a_5 \times Y^5_{nor\_mea} + a_4 \times Y^4_{nor\_mea} + a_3 \times Y^3_{nor\_mea} + a_2 \times Y^2_{nor\_mea} + a_1 \times Y_{nor\_mea} + a_0 \quad \text{[Equation 2]}$$

in the equation 2, $Y_{nor\_mea}$ represents normalized measured camera intensity, X represents corresponding a screen brightness value before compensation, $a_5, a_4, a_3, a_2, a_1$ and $a_0$ represent coefficient values which are obtained by fitting inverse function characteristics obtained using a measured non-linear response characteristic graph with an equation of high degree (quantic equation).

According to another aspect of the present disclosure, a brightness value to be input in a screen in order to linearize response characteristics of normalized measured camera intensity on the basis of the equations 1 and 2 into linear response characteristics is represented by equation 3.

$$X_{new\_input} = a_5 \times Y^5_{linear\_model} + a_4 \times Y^4_{linear\_model} + a_3 \times Y^3_{linear\_model} + a_2 \times Y^2_{linear\_model} + a_1 \times Y_{linear\_model} + a_0 = a_5 \times (\alpha X + \beta)^5 + a_4 \times (\alpha X + \beta)^4 + a_3 \times (\alpha X + \beta)^3 + a_2 \times (\alpha X + \beta)^2 + a_1 \times (\alpha X + \beta) + a_0 \quad \text{[Equation 3]}$$

in the equation 3, all coefficient values are obtained through equations 1 and 2, X represents screen brightness values before compensation, and $X_{new\_input}$ represents a screen brightness value after compensation, allowing linearizing response characteristics.

When normalized measured camera intensity on the basis of equations 1, 2 and 3 are linearized through equation 1, a brightness value to be input in a screen is obtained from equation 3, followed by applying the same to an actual screen, allowing obtaining linear response characteristics.

Effects of the Invention

The present disclosure is capable of compensating non-linear response characteristics which were caused by digital devices (i.e., screen, camera) in phase-shifting deflectometry.

According to an exemplary embodiment of the present disclosure, a first step is to create a look up table considering non-linear response characteristics in a screen pattern to linearize response characteristics of a measurement system closer to linearity. In the second stage, the AIA phase shift algorithm, which is widely used to reduce the phase shift error in the interferometer, is applied to compensate the nonlinear response characteristics. Thus, the present disclosure is directed to providing a method for compensating non-linear response characteristics in measuring the shape of an object using phase-shifting deflectometry, which may measure a phase without any errors caused by non-linear response characteristics in phase-shifting deflectometry and the three dimensional shape of a measurement object with a high accuracy.

In the meantime, effects of the invention are not limited to the aforementioned problems, and other effects, which are not mentioned above, may be clearly understood from the following description by those skilled in the art to which the present disclosure pertains.

BRIEF DESCRIPTION OF THE DRAWINGS

The following drawings attached to the present specification illustrate exemplary embodiments of the present disclosure and serve to further understand the technical spirit of the present disclosure together with the detailed description of the present disclosure, and the present disclosure should not be interpreted as being limited to the items illustrated in the drawings.

FIG. 1 shows a schematic diagram of a system for measuring a 3D shape using phase-shifting deflectometry.

FIG. 2 is a non-linear response characteristic graph showing measured camera brightness intensity values according to predetermined steps from a minimum value to a maximum value of overall screen brightness of the screen.

FIG. 3 is a normalized linear response characteristic model graph which connects a minimum value and a maximum value in FIG. 2.

FIG. 4 is a response characteristic graph linearized according to an exemplary embodiment of the present disclosure.

FIG. 5 is a flow chart of a method for compensating phase-shifting amounts according to an exemplary embodiment of the present disclosure.

REFERENCE NUMERALS

1: an object to be measure, 10: a screen, 20: a camera

DETAILED DESCRIPTION OF THE PREFERRED EMBODIMENTS

According to an exemplary embodiment of the present disclosure, the present disclosure relates to a system and a method for compensating non-linear response characteristics which were caused by digital devices (i.e., screen (10), camera (20)) in phase-shifting deflectometry.

A system for compensating non-linear response characteristics in phase-shifting deflectometry according to the exemplary embodiment of the present disclosure may include a pattern generating portion which generates a pattern, allowing projecting the same to a measurement object (1), a detector which obtains an image of a deformed pattern reflected from the measurement object (1), and a compensation means which compensates non-linear response characteristics generated due to the pattern generating portion and the detector.

FIG. 1 shows a schematic diagram of a system for measuring a 3D shape using phase-shifting deflectometry. A pattern generating portion according to an exemplary embodiment of the present disclosure is the screen (10) of a display device and projects a generated sinusoidal pattern to the measurement object (1). A detector configured with the camera (20) allows incidence of a pattern reflected to the measurement object (1) and measures intensity. Further, an analysis means measures and analyzes a phase from a deformed pattern which is measure in such a camera (20), allowing obtaining a 3D shape for the measurement object (1). Further, a control portion is connected with both of the screen (10) and the camera (20), allowing controlling the same.

A compensation means according to an exemplary embodiment of the present disclosure is configured to compensate measurement errors by a non-linear component induced from the screen (10) and the camera (20). In phase-shifting deflectometry according to the exemplary embodiment of the present disclosure, a method for compensating non-linear response characteristics generated due to the screen (10) and the camera which are digital devices is carried out through two-stage procedures.

In the first stage, a look up table (LUT) considering non-linear response characteristics is created on a pattern of the screen (10), followed by being applied in order to linearize response characteristics of a measurement system. The non-linear response characteristics are compensated close to be more linear through the first stage. Thus, the first stage is considered as a preparation stage for decreasing measurement errors in the next stage. That is, the compensation means according to the exemplary embodiment of the present disclosure linearizes non-linear response on the basis of the look up table (LUT) considering of the non-linear response characteristics of the screen (10) and the camera.

In the second stage, the non-linear response characteristics are compensated by applying an advanced iterative algorithm (AIA) which is widely used in order to decrease phase-shifting errors in an interferometer. Since error components generated due to phase-shifting errors induce the same error components as distortion of a pattern generated by non-linear response characteristics of digital devices, the measurement accuracy of a phase will be increased by using the same.

The aforementioned two stage compensating procedures are capable of measuring a phase accurately without any errors due to non-linear response characteristics in phase-shifting deflectometry, thereby measuring a 3D shape for the measurement object (10) with a high accuracy.

DETAILED DESCRIPTION OF THE EMBODIMENTS

Hereinafter, configurations of the respective stages will be described in detail.

The first stage relates to linearization of non-linear response on the basis of a look up table (LUT) considering non-linear response characteristics of the screen (10) and the camera. According to the exemplary embodiment of the present disclosure, FIG. 2 is a non-linear response characteristic graph showing normalized measured camera brightness intensity values according to predetermined steps from a minimum value to a maximum value of overall screen brightness of the screen (10).

According to the first stage of the exemplary embodiment of the present disclosure, in order to create the look up table (LUT), following experimentally obtaining non-linear response characteristics of the screen (10) and the camera, an appropriate compensation value is applied to a pattern of the screen (10), allowing distorting a conventional sinusoids and consequently linearizing response characteristics of a system overall.

More particularly, overall screen brightness of the screen (10) is set up to be displayed according to predetermined steps from a minimum value to a maximum value. That is, for instance, the screen (10) is provided with a brightness value corresponding to gray scales of 0 to 255. And an image reflected through the measurement object (1) is saved through the camera, followed by showing normalized measured brightness value as shown in FIG. 2. FIG. 3 is a graph which connects the minimum value and the maximum value in FIG. 2. FIG. 4 is a response characteristic graph linearized according to the exemplary embodiment of the present disclosure.

The creation of the look up table (LUT) relates to a process for generating a function, allowing linearizing the measurement intensity of the camera based on the non-linear response characteristic graph previously measured. A linear response characteristic equation which connects the minimum value ($I_{min}$) and the maximum value ($I_{max}$) in the measured non-linear response characteristic graph is generated as the following equation 1.

$$Y_{linear\_model} = \alpha X + \beta \quad \text{[Equation 1]}$$

in the equation 1, X represents a screen brightness value (X=0, 1, 2, 3, 4 ..., 255) which are provided as inputs before compensation, $\alpha$ and $\beta$ represent coefficient values which linearize response characteristics according to screen brightness values and which are provided respectively by $\alpha = (I_{max} - I_{min})/255$ and $\beta = I_{min}$, and a normalized linear response characteristic model value is $Y_{linear\_model}$ therethrough.

Further, in order to obtain reversed function response characteristics of FIG. 3, an input and an output are converted into normalized measured camera intensity and a gray scale value respectively, allowing generating an equation of high degree (quantic equation) as the following equation 2.

$$X = a_5 \times Y^5_{nor\_mea} + a_4 \times Y^4_{nor\_mea} + a_3 \times Y^3_{nor\_mea} + a_2 \times Y^2_{nor\_mea} + a_1 \times Y_{nor\_mea} + a_0 \quad \text{[Equation 2]}$$

in the equation 2, $Y_{nor\_mea}$ represents normalized measured camera intensity, X represents a corresponding screen brightness value before compensation, $a_5, a_4, a_3, a_2, a_1$ and $a_0$ represent coefficient values which are obtained by fitting inverse function characteristics obtained using a measured non-linear response characteristic graph with an equation of high degree (quantic equation).

A brightness value to be input in the screen in order to linearize the normalized measured camera intensity on the basis of the equations 1 and 2 is represented by equation 3.

$$X_{new\_input} = a_5 \times Y^5_{linear\_model} + a_4 \times Y^4_{linear\_model} + a_3 \times Y^3_{linear\_model} + a_2 \times Y^2_{linear\_model} + a_1 \times Y_{linear\_model} + a_0 = a_5 \times (\alpha X + \beta)^5 + a_4 \times (\alpha X + \beta)^4 + a_3 \times (\alpha X + \beta)^3 + a_2 \times (\alpha X + \beta)^2 + a_1 \times (\alpha X + \beta) + a_0 \quad \text{[Equation 3]}$$

TABLE 1

| Screen brightness value | Screen brightness value (X) before compensation | Screen brightness value ($X_{new\_input}$) after compensation |
|---|---|---|
| 0 | 0 | $a_5 \times \beta^5 + a_4 \times \beta^4 + a_3 \times \beta^3 + a_2 \times \beta^2 + a_1 \times \beta + a_0$ |
| 1 | 1 | $a_5 \times (\alpha X + \beta)^5 + a_4 \times (\alpha X + \beta)^4 + a_3 \times (\alpha X + \beta)^3 + a_2 \times (\alpha X + \beta)^2 + a_1 \times (\alpha X + \beta) + a_0$ |
| ... | ... | ... |
| 255 | 255 | $a_5 \times (255\alpha + \beta)^5 + a_4 \times (255\alpha + \beta)^4 + a_3 \times (255\alpha + \beta)^3 + a_2 \times (255\alpha + \beta)^2 + a_1 \times (255\alpha + \beta) + a_0$ |

That is, as shown in table 1, according to the exemplary embodiment of the present disclosure, if a screen brightness value is provided before compensation, response characteristics as shown in FIG. 2 are obtained. If a screen brightness value is provided following obtaining a compensation value through the look up table (LUT) and applying the same to compensation, a result as shown in FIG. 4 is obtained.

Next, hereinafter, the second compensation procedure according to an exemplary embodiment of the present disclosure will be described. The second stage relates to compensation of phase-shifting amounts generated due to non-linear response characteristics according to the exemplary embodiment of the present disclosure.

The second stage according to an exemplary embodiment of the present disclosure may compensate phase-shifting amounts generated due to non-linear response characteristics using a phase-shifting algorithm, AIA (Advanced iterative algorithm). FIG. 5 is a flow chart of a method for compensating phase-shifting amounts according to an exemplary embodiment of the present disclosure.

As shown in FIG. 5, the second compensation procedure relates to a method for obtaining a phase-shifting value more accurately by compensating non-linear phase-shifting amounts generated due to non-linear response characteristics through repeated calculations when applying the phase-shifting algorithm. This AIA is disclosed in a non-patent literature as a prior art, which is applied to only an interferometer. However, it is characteristically introduced into phase-shifting deflectometry according to the exemplary embodiment of the present disclosure.

As shown in FIG. 5, firstly, any initial phase-shifting value (initial phase shift) is determined (S1). Secondly, a phase distribution is calculated on the basis of this phase-shifting value (S2). Thirdly, the phase-shifting value is updated on the basis of the inversely calculated phase distribution (S3).

Fourthly, it is determined if a difference between the phase-shifting value and the updated phase-shifting value is equal to or less than a set up convergence value (S4). Finally, the steps S2 and S3 are performed repeatedly and a converged phase-shifting value is ultimately compensated therethrough (S5).

The present disclosure is capable of compensating non-linear response characteristics which were caused by digital devices (i.e., screen, camera) in phase-shifting deflectometry. According to an exemplary embodiment of the present disclosure, a first step is to create a look up table considering non-linear response characteristics in a screen pattern to linearize response characteristics of a measurement system closer to linearity. In the second stage, the ALA phase shift algorithm, which is widely used to reduce the phase shift error in the interferometer, is applied to compensate the nonlinear response characteristics. Thus, the present disclosure is directed to providing a method for compensating non-linear response characteristics in measuring the shape of an object using phase-shifting deflectometry, which may measure a phase without any errors caused by non-linear response characteristics in phase-shifting deflectometry and the three dimensional shape of a measurement object with a high accuracy.

What is claimed is:

1. A method for compensating non-linear response characteristics in phase-shifting deflectometry comprising steps of:

generating a pattern by a pattern generating portion and projecting the same to a measurement object, wherein the pattern generating portion is a screen;

obtaining an image of a deformed pattern reflected from the measurement object by a detector, wherein the detector is a camera;

linearizing non-linear responses on the basis of a look up table considering non-linear response characteristics of the screen and the camera;

compensating phase-shifting amounts generated due to non-linear response characteristics;

calculating a non-linear response characteristic graph by normalizing measurement intensity of a minimum value to a maximum value measured in the camera according to predetermined steps; and converting the non-linear response characteristics into linear response characteristics on the basis of the look up table.

2. The method for compensating non-linear response characteristics in phase-shifting deflectometry of claim 1, wherein the step of compensating the phase-shifting amounts allows computing the phase-shifting amounts by applying AIA phase-shifting algorithm, and comprises steps of:

a first step of computing the phase-shifting amounts by applying AIA phase-shifting algorithm, followed by setting up any initial phase-shifting value;

a second step of calculating a phase distribution on the basis of a phase-shifting value a third step of updating a phase-shifting value on the basis of a calculated phase distribution; and a fourth step of repeating the second and third steps until a difference between the phase-shifting value and the updated phase-shifting value becomes equal to less than a set convergence value.

3. The method for compensating non-linear response characteristics in phase-shifting deflectometry of claim 2, wherein the step of linearizing non-linear responses allows calculating a non-linear response characteristic graph which shows normalized measured detector intensity according to predetermined steps from a minimum value to a maximum value of overall brightness values of the pattern generating portion, and allows converting the non-linear response characteristics into linear response characteristics on the basis of a look up table.

4. The method for compensating non-linear response characteristics in phase-shifting deflectometry of claim 3, wherein in a non-linear response characteristic graph, a normalized linear response characteristic model equation of the following equation 1 which linearly connects a minimum value ($I_{min}$) and a maximum value ($I_{max}$) is generated:

$$Y_{linear\_model} = \alpha X + \beta \quad \text{[Equation 1]}$$

in the equation 1, X represents a screen brightness value (X=0, 1, 2, 3, 4 . . . , 255) which is provided as input before compensation, $\alpha$ and $\beta$ represent coefficient values which linearize response characteristics according to screen brightness values and which are provided respectively by $\alpha = (I_{max} - I_{min})/255$ and $\beta = I_{min}$, and a normalized linear response characteristic model value is $Y_{linear\_model}$ therethrough.

5. The method for compensating non-linear response characteristics in phase-shifting deflectometry of claim 4, wherein an input and an output from a measured non-linear response characteristic graph are converted respectively into normalized measurement intensity and screen a brightness value, allowing generating an equation of high degree represented by the following equation 2 and consequently obtaining inverse function response characteristics:

$$X = a_5 \times Y^5_{nor\_mea} + a_4 \times Y^4_{nor\_mea} + a_3 \times Y^3_{nor\_mea} + a_2 \times Y^2_{nor\_mea} + a_1 \times Y_{nor\_mea} + a_0 \quad \text{[Equation 2]}$$

in the equation 2, $Y_{nor\_mea}$ represents normalized measured camera intensity, X represents a corresponding screen brightness value before compensation, $a_5$, $a_4$, $a_3$, $a_2$, $a_1$ and $a_0$ represent coefficient values which are obtained by fitting inverse function characteristics obtained using a measured non-linear response characteristic graph with an equation of high degree (quantic equation).

6. The method for compensating non-linear response characteristics in phase-shifting deflectometry of claim 5, wherein a brightness value to be input in a screen in order to linearize response characteristics of normalized measured camera intensity on the basis of the equations 1 and 2 into linear response characteristics is represented by equation 3, when a normalized measured camera value on the basis of equations 1, 2 and 3 is linearized through equation 1, a brightness value to be input in a screen is obtained from equation 3, followed by applying the same to an actual screen, allowing obtaining linear response characteristics:

$$X_{new\_input} = a_5 \times Y^5_{linear\_model} + a_4 \times Y^4_{linear\_model} + a_3 \times Y^3_{linear\_model} + a_2 \times Y^2_{linear\_model} + a_1 \times Y_{linear\_model} + a_0 = a_5 \times (\alpha X + \beta)^5 + a_4 \times (\alpha X + \beta)^4 + a_3 \times (\alpha X + \beta)^3 + a_2 \times (\alpha X + \beta)^2 + a_1 \times (\alpha X + \beta) + a_0 \quad \text{[Equation 3]}$$

in the equation 3, all coefficient values are obtained through equations 1 and 2, X represents a screen brightness value before compensation, and $X_{new\_input}$ represents a screen brightness value after compensation, allowing linearizing response characteristics.

* * * * *